May 12, 1959    R. A. FRISBY    2,886,291
SELF-MEASURING CARBIDE DRILLS
Filed Dec. 5, 1955
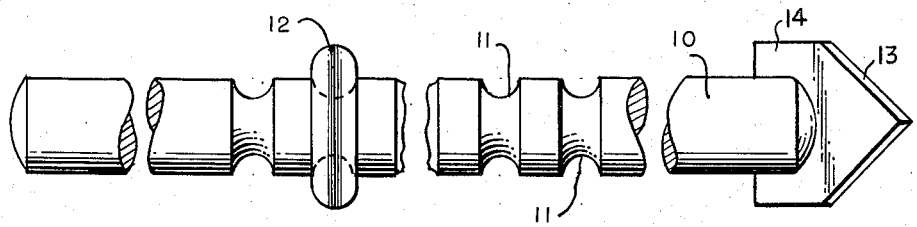
FIG. 1.
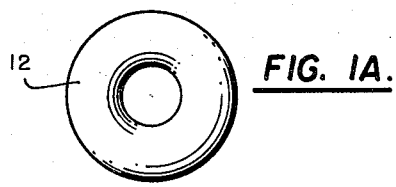
FIG. 1A.
FIG. 2.
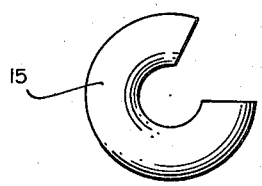
FIG. 3.
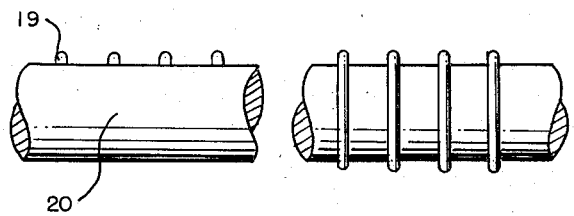
INVENTOR
Raymond A. Frisby

2,886,291
SELF-MEASURING CARBIDE DRILLS

Raymond A. Frisby, Freeport, N.Y.

Application December 5, 1955, Serial No. 551,065

4 Claims. (Cl. 255—61)

The present invention concerns carbide masonry drills having measuring means thereon for determining the depth of the hole being drilled.

It is an object of the invention to provide a simple inexpensive and reliable means for measuring the depth drilled by carbide-tipped masonry drills, when being used to drill holes in masonry and the like.

It is an object of the invention to provide integral means in the stem of the drill itself for measuring the depth of the hole drilled.

It is an object of the invention to provide adjustable means which may be mounted on the stem of a drill for measuring the depth of the hole being drilled with or without anchoring means therefor.

Carbide masonry drills are chiefly employed to drill holes in masonry to receive some type of expanding or holding device for screws, bolts and the like. The drilled holes are frequently required to be at fairly exact depth to accommodate the desired holding devices. According to one form of the invention, it is proposed to mark the stem of the drills with circular grooves spaced in fractions of an inch so that there is a clear means of indicating to the drill operator the exact depth of the hole at any given time, without removing the drill from the hole.

While the grooves may be used alone, they may also serve as anchor means. Accordingly in another form of the invention, it is proposed to place small elastic doughnut-shaped members made of rubber, plastic or composition, over the shank of the drill so the doughnut-shaped member will fit into one of the several grooves or depressions and may be rolled along the shank of the drill from one depression to another. Where the doughnut-shaped member has sufficient grasping power, it need not be entirely circular but may have a segment removed so that it can be snapped into a selected groove. Again, the circular grooves may be limited and a scale of inches and fractions thereof impressed as short shallow depressions on the drill shank or stem. The rubber doughnut member can then be rolled along the drill to the proper position, as indicated by the scale, and so indicate the depth of the hole being drilled. Although not a preferred form of the invention, the grooves as such may be eliminated or comprise the actual scale stamped in the shank.

However, it has been found that better results are obtained by the use of shallow depressions so as to anchor the rubber doughnut in place and prevent its displacement. Again, shallow grooves or depressions in the drill stem are readily visible even though covered with dust, which may obscure a scale merely printed in the drill stem. Where there is any danger of weakening the drill stem, the grooves may be replaced by slight ridges at their outer margins so that the rubber doughnut or segment can be rolled between adjacent ridges or inserted therebetween and held in position thereby.

In the drawing, like numerals refer to like parts throughout.

Figure 1 is a plan view of one form of the invention;

Figure 1A is a plan view of an annular rubber marking means employed in Figure 1.

Figure 2 is a plan view of a modified form of rubber ring;

Figure 3 is a plan view of a variation of the invention.

Referring to Figure 1, a carbide tipped drill is provided with a stem, shaft or shank 10, which may have therein a series of spaced grooves or depressions 11 which are regularly positioned along the shank of the drill at desired distances apart, which may be inches, centimeters or any fractions thereof. On the shank of the drill is shown a rubber doughnut or marking ring 12 which may be positioned in one of the grooves 11. Where the ring 12 is complete as shown in Figures 1 and 1A, it may be rolled from groove to groove along the shank 10 to the proper position. One end of the shank 10 is provided with a carbide tip 13, the width of which, at 14, is preferably greater than the outer diameter of the rubber ring 12 so that ring 12 need not touch the sides of the hole being drilled.

Figure 2 shows a segmental ring portion 15, similar to ring 12 but with a section of approximately 60° removed. It will be understood that these segments 15 may take any desired shape, depending upon the shape of the drill shank 10, or the shape of the depressions 11 which may, of course, also be triangular, rectangular, hexagonal, or the like. The segments 15 may be of spring metal, if desired, and may be removably clipped into place.

In Figure 3 the grooves 11 are replaced by paired ridges 19 for holding either the rubber rings 12 or the segments 15. It will be understood that the ridges 19 need not be paired, but may be distributed along the length of the shank 20, according to the desired measurements of depth to be taken, and that the clips or rings may be inserted or rolled between any two of the ridges, bumps or rings, comprising the positioning elements 19. Bumps or ridges 19 may be circumferential, partially so, or merely raised areas of limited extent, as for example the length of the scale markings 17 in Figure 3.

While there has been described above what are at present believed to be preferred forms of the invention, the disclosure will suggest variations and equivalent structures to those skilled in the art. All such variants and equivalent structures which fall within the true spirit of the invention, are intended to be covered by the generic terminology of the appended claims.

Having thus described my invention, I claim:

1. A drill having a shank with measured spaced depressions therein, indicating means removably positioned in said depressions and comprising an elastic ring which can be rolled along the said shank.

2. A masonry drill having an elongate shank and a carbide tip of greater transverse dimensions than the diameter of said shank, spaced measuring depressions on said shank and an elastic ring of substantially circular cross-section surrounding said shank and capable of being rolled there along from one depression to another.

3. The combination set forth in claim 2, said elastic ring comprising a rubber ring surrounding said shank.

4. A masonry drill having an elongate shank, shoulder means formed in the metal of said shank and spaced at measured intervals along said shank, elastic means for gripping said shank and positioned on said shank by a pair of said shoulder means, said elastic means being capable of being rolled along said shank from one pair of shoulder means to another.

References Cited in the file of this patent

UNITED STATES PATENTS

| | | |
|---|---|---|
| 2,300,813 | Savage | Nov. 3, 1942 |
| 2,573,640 | Connors | Oct. 30, 1951 |
| 2,673,714 | Hargrave | Mar. 30, 1954 |

FOREIGN PATENTS

| | | |
|---|---|---|
| 112,040 | Great Britain | Dec. 19, 1917 |
| 332,914 | Great Britain | July 14, 1930 |